(12) United States Patent
Ito et al.

(10) Patent No.: US 6,262,969 B1
(45) Date of Patent: Jul. 17, 2001

(54) OPTICAL DISK

(75) Inventors: Hideaki Ito; Yuji Arai; Yuaki Shin, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/249,593

(22) Filed: Feb. 12, 1999

(30) Foreign Application Priority Data

Feb. 21, 1998 (JP) .................................................. 10-056268

(51) Int. Cl.⁷ ................................ G11B 5/72; G11B 7/24
(52) U.S. Cl. ................................................................ 369/291
(58) Field of Search ................................... 369/291, 283; 360/135

(56) References Cited

U.S. PATENT DOCUMENTS

| | | | |
|---|---|---|---|
| 3,540,737 | * 11/1970 | Borthwick . | |
| 3,961,656 | * 6/1976 | Aggarwal | 206/309 |
| 4,879,710 | * 11/1989 | Iijima | 369/291 |
| 5,757,765 | * 5/1998 | Chen | 369/291 |
| 5,787,069 | * 7/1998 | Lowe et al. | 369/291 |
| 5,912,875 | * 6/1999 | Lowe et al. | 369/291 |
| 5,922,430 | * 7/1999 | Biddlecome | 428/66.6 |
| 6,054,009 | * 4/2000 | Cote et al. | 156/249 |

FOREIGN PATENT DOCUMENTS

| | | |
|---|---|---|
| 7-262616 | * 10/1995 | (JP) . |
| 9-270177 | * 10/1997 | (JP) . |
| 11-102542 | * 4/1999 | (JP) . |

* cited by examiner

*Primary Examiner*—William Klimowicz
(74) *Attorney, Agent, or Firm*—Flynn, Thiel, Boutell & Tanis, P.C.

(57) ABSTRACT

An optical disc having a transparent substrate, being recordable with a signal (s) by irradiating recording light at the side of the transparent substrate thereof, comprises a cover sheet being attached on the transparent substrate at a surface side for incidence of recording light and reproducing light, in detachable manner, wherein the stretching rate of the cover sheet is selected to be equal or less than 200%. Further, the thermal contraction rate of the cover sheet is selected to be equal or less than 1.5%, and the bonding force thereof onto a surface of the transparent substrate per 25 mm width to be from 10 g/25 mm width to 300 g/25 mm width. Thereby, the curve on the optical disc can be suppressed, if it is attached with the cover sheet of the surface of the transparent substrate thereof.

8 Claims, 3 Drawing Sheets

OPTICAL DISK

BACKGROUND OF THE INVENTION

1. Field of the Invention

The present invention relates to a recordable optical disc on to which signals can be recorded by irradiating recording light from the transparent substrate side thereof, and in particular to an optical disc, on the surface of which is adhered a cover sheet, at the transparent substrate side thereof, i.e., a light irradiation or incident surface.

2. Description of Prior Art

Optical discs, such as a compact disc (i.e., CD) used as a medium for use in music and a CD-ROM used as a medium mainly for use in a computer and so on, both of which are available in the market, are media of read only (i.e., it is only possible to read out the signal or information from them). On the read only optical discs, ordinarily, signals are recorded by forming so-called pits of concave and/or convex shapes on a surface of the above transparent substrate, with the use of a pattern or mold which can be obtained through an electric casting process or press process, etc., when forming the transparent substrate from a polycarbonate or the like. With such an optical disc, however it is impossible for a user to record information by him/herself.

In contrast to this, from the end of 1980's to the beginning of 1990's, a so-called CD of the Write-once type (i.e., CD-R) was developed, which is recordable and compatible with the above CD. With this CD-R, ordinarily, it is shipped without recording the signals thereon, and the user can record arbitrary information on it at his/her desire only once. Thereby, it is possible for the user to obtain a copy or reproduce a CD or CD-ROM on which the arbitrary information is recorded, and which is compatible with such a CD or CD-ROM, at a relatively low cost.

Ordinarily, the CD-R is formed with a disc-like transparent substrate of a transparent synthetic resin, of such as polycarbonate or the like, on which is formed a recording layer of a coloring matter or pigment, such as a cyanine pigment. Further thereon, there is attached a metal reflection layer of such as an Au film, on which is further provided a protection layer of an ultraviolet curing resin. On the side surface of the above transparent substrate on which the pigment recording layer is formed, there is provided a tracking guide of a spiral shape, having a pitch of 1.6 $\mu$m for example.

When recording the signal onto such the CD-R, a spot of recording light ray which is pulse-modulated is irradiated onto the pigment recording layer, while tracking the spot of the recording light ray onto the tracking guide, which is irradiated from an optical pickup through the transparent substrate onto the pigment recording layer, thereby writing the pulse signal as pits onto it. In this instance, the pigment material of the pigment recording layer being heated to melt and partially decompose corresponding to the pulse signal interacts with the resin material of the transparent substrate being heated and melted, mutually, thereby forming the pits on the transparent substrate. With this, desired information signal which can be read out in the same manner as in the CD and the CD-ROM can be written onto it.

With this CD-ROM, it is possible to obtain an optical disc, on which information completely compatible with the CD and the CD-ROM can be recorded with ease on a desk-top environment, without large-scaled manufacturing facilities nor complicated manufacturing processes which are used in the manufacturing processes of such as the CD and the CD-ROM for use of read only.

The transparent substrate of the optical disc is easily attracts dust on the light incident surface due to the static electricity generated thereon, since it is made of a synthetic resin, such as polycarbonate or the like, and is easily scratched when receiving friction with hard things or shocks on it. As mentioned previously, the dust and/or the scratches attached upon the light incident surface of the transparent substrate disturbs the incidence of the laser light, thereby greatly deteriorating the characteristics, in particular in the wiring characteristic thereof.

For solving the above-mentioned problem, in accordance with the conventional optical disc, a detachable cover sheet is attached upon the surface of the transparent substrate on which the recording light and the reproducing light are incident to protect the surface of the transparent surface. For example, with the disc on which a transparent cover sheet is attached, recording and the reproducing are possible by attaching the cover sheet upon the surface of the transparent substrate. While in a case where it is attached with a colored sheet, which has an effect of cutting off the light of the light sensitive wavelength region of the pigment recording layer or which is opaque or non-transparent, it has also an effect of protecting from deterioration the pigment recording layer due to the natural light, etc. Further, with the cover sheet containing an anti-static agent therein, it is possible to protect from adhesion of the duct due to the static electricity. In this manner, by attaching the cover sheet upon the surface of the transparent substrate of the recordable optical disc such as the CD-R or the like, there can be obtained various advantages.

By attaching the cover sheet upon the surface of the transparent substrate, however, there also can be caused disadvantages. A representative example of the disadvantages is a curving or warping of the optical disc. For instance, according to a so-called Orange Book which describes a standard for the CD-R, an allowable maximum angle of curving for the disc is determined to be equal or less than 0.6 deg. If the optical disc is curved by attaching the cover sheet on it, and if the curved angle exceeds that of the standard, it may cause recording errors and/or reproducing errors.

SUMMARY OF THE INVENTION

An object is, according to the present invention, for solving the drawbacks in the conventional optical disc attached with the cover sheet as mentioned above, to provide an optical disc attached with a cover sheet on the surface of a transparent substrate thereof, but which has hardly occurred the curving thereof.

For achieving the above-mentioned object, as a result of investigation by the inventors of the present invention, as one of the causes of curving in the optical disc can be listed the shrinkage or contraction of the sheet material due to change with the passage of time. Accordingly, it is necessary to use the cover sheet made of the material showing as small a change as possible with the passage of time, for making the curving of the optical disc small. As the result of investigating this respect in more detail, it is noted and found that, the smaller the tensile elongation or stretch rate of the sheet material, the smaller the curving of the optical disc due to the change with the passage of time. Then, the stretch rate of the cover sheet 6 which is attached onto the transport substrate 1 of the optical disc is selected to be equal or less than 200%. Further, it is also noticed that, the smaller the heat or thermal contraction rate of the sheet material, the smaller the curving of the optical disc due to the change with the passage of time. Then, the thermal contraction rate of the cover sheet 6 which is attached onto the transparent substrate 1 of the optical disc is selected to be equal or less than 1.5%. Furthermore, it is also noticed that, the smaller the bonding force of the cover sheet 6 onto the transparent substrate 1, the smaller the curving of the optical disc due to the change of the material of the cover sheet 6 with the passage of time. Then, the bonding force of the cover sheet 6 onto the surface of the transparent substrate 1 per width of 25 mm is selected to be from 10 g/25 mm width up to 300 g/25 mm width.

An optical disc, according to the present invention, which is recordable with signals by irradiation of recording light from a side of transparent substrate thereof, comprises a cover sheet provided on the transparent substrate 1 at a surface side thereof for incidence of recording light and reproducing light, in detachable manner, and wherein a stretch rate of the cover sheet 6 is equal to or less than 200%.

The smaller the stretch rate of the cover sheet 6, the better, however, there is no material which shows the stretch rate of zero (0). Therefore, it is impossible to determine the lower limit of the stretch rate particularly or definitively. Also, the above-mentioned upper limit in the stretch rate of the cover sheet 6 is so selected that the curving of the optical disc does not exceed 0.6 deg. being determined for the CD-R, when it is attached with the cover sheet 6 and is conducted by an environment test under a predetermined condition which will be mentioned later.

Further, the thermal contraction rate of the cover sheet 6 is selected to be equal to or less than 1.5%. Also, the smaller the thermal contraction rate of the cover sheet 6, the better, however, there is no material which shows the thermal contraction rate of zero (0). Therefore, it is impossible to determine the lower limit of the thermal contraction rate particularly or definitively. Also, the above-mentioned upper limit in the thermal contraction rate of the cover sheet 6 is selected so that the curving of the optical disc does not exceed 0.6 deg. as determined for the CD-R, when the optical disc is attached with the cover sheet 6 and is conducted by the environment test under predetermined conditions which will be mentioned later.

Further, the bonding force of the cover sheet 6 onto the surface of the transparent substrate 1 is selected to be from 10 g/25 mm width to 300 g/25 mm width. If the bonding force of the cover sheet 6 onto the transparent substrate 1 is too strong, the transparent substrate 1 is bent or curved due to the shrinkage of the cover sheet 6 with the passage of time, thereby causing the curving. The upper limit in the above-mentioned bonding force of the cover sheet 6 is so selected that the curving of the optical disc does not exceed 0.6 deg. as determined for the CD-R, when the optical disc is attached with the cover sheet 6 and is conducted by the environment test under predetermined conditions which will be mentioned later. Moreover, if the bonding force of the cover sheet 6 is too strong, the adhesive easily remains on the surface of the transparent substrate 1, and it dims the surface of the transparent substrate 1. Such dimming induces errors in the recording or reproducing operations. The upper limit of the above bonding force is almost coincident with the upper limit, at which the dimming does not occur. On the contrary, if the adhesive is too weak, the cover sheet 6 is automatically removed by itself from the surface of the transparent substrate 1, thereby not performing the function inherent as the cover sheet 6. Accordingly, the lower limit of the bonding force is so determined that the cover sheet 6 can perform the inherent function thereof at the minimum.

It is also effective to form the fine wrinkles of convex and/or concave shape on the cover sheet 6 and attach it into the surface of the transparent substrate 1. The wrinkles reduce the bonding force onto the surface of the transparent substrate 1, as well as absorb the extension or shrinkage of the cover sheet 6 due to the change with the passage of time therewith, so as to prevent it from reaching up to the transparent substrate 1. Therefore, no stress occurs in the transparent substrate 1 following the change of the cover sheet 6 with the passage of time, thereby preventing the transparent substrate 1 from curving due to the bending thereof.

However, the thickness of the cover sheet 6 is selected to be from 10 $\mu$m up to 1,000 $\mu$m. This is because, if the cover sheet is too thin, the strength of the sheet itself is weakened, thereby making the handling of it difficult, i.e., crinkling or crumpling easily occurs when it is adhered onto the transparent substrate 1. While, if it is too thick, it becomes a cause of increasing the stress occurring in the transparent substrate due to the deformation which follows the thermal contraction of the cover sheet 6 and so on.

As is mentioned above, according to the present invention, it is possible to prevent from occurring the curving of the optical disc, following the change of the cover sheet 6 with the passage of time, thereby enabling protection of the optical disc in advance from the curving thereof when it is attached with the cover sheet on the surface of the transparent substrate 1 thereof.

DETAILED DESCRIPTION OF PREFERRED EMBODIMENTS

Figure 1:
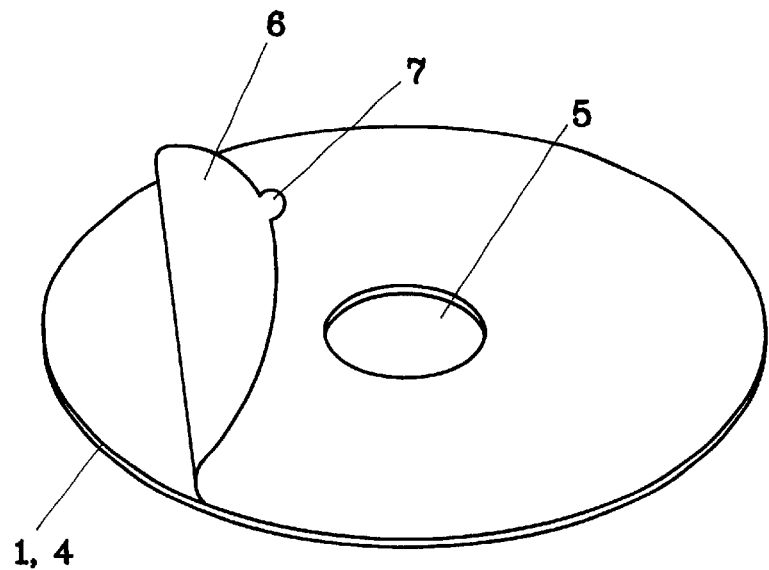
FIG. 1 shows a perspective view of a transparent substrate of the optical disc according to the present invention, removing a cover sheet partially from the surface thereof and seeing from the side of the substrate.

Hereinafter, embodiments according to the present invention will be fully explained by referring to the attached drawings.

As a transparent substrate 1 a disc-like synthetic resin substrate is used, such as a polycarbonate substrate formed by an injection molding method. The transparent substrate 1 is a disc in the shape of a donut, having sizes, for example, a thickness of 1.2 mm, an outer diameter of 120 mm $\phi$ and an inner diameter of 15 mm $\phi$. A bore of a diameter of 15 mm $\phi$ formed in the center of the transparent substrate 1 is a so-called clamping bore 5 for positioning it into a spindle for rotating the optical disc in a recording and/or reproducing apparatus for the optical disc. The area or region from 26 mm $\phi$ up to 33 mm $\phi$ at the outside of the clamping bore 5 is a so-called clamping area at which the spindle for rotating the optical disc clamps it.

The transparent substrate 1 has a tracking guide on one side surface thereof. For instance, the area or region from 46 mm φ up to 117 mm φ in diameter on the one side surface of the transparent substrate 1 is a signal recording area, in which is formed a pre-groove of a spiral shape, having a width 0.8 μm, a depth 0.08 μm, a pitch 1.6 μm, as shown in FIGS. 2 and 3.

Figure 2:
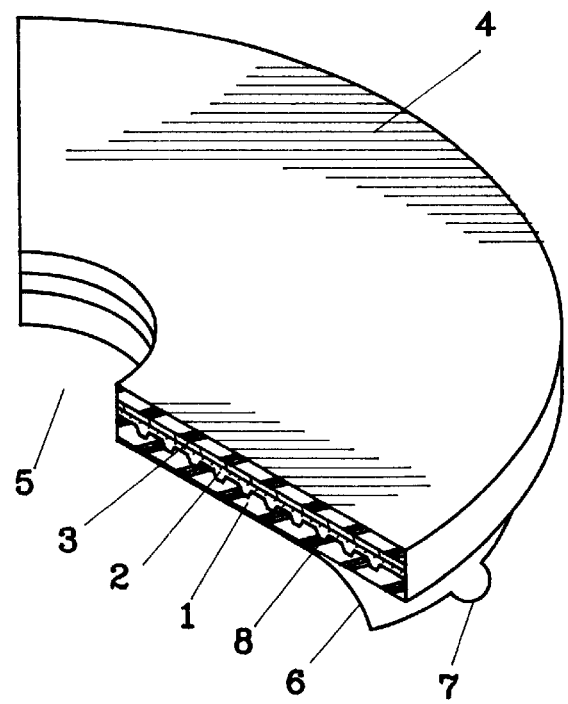
FIG. 2 shows an enlarged perspective view of the transparent substrate including the section views thereof, removing the cover sheet and seeing from a protection layer side thereof.
Figure 3:
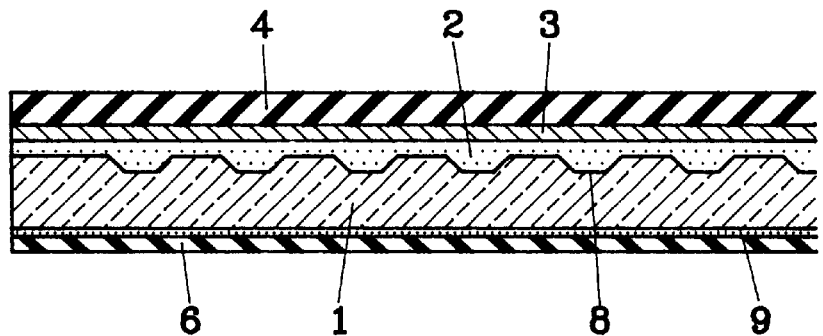
FIG. 3 shows a vertical cross section view of the optical disc according to the present invention.

A coloring matter, such as cyanine pigment etc., dissolved into an organic solvent for example, is coated onto the area from 45 mm φ up to 118 mm φ in diameter on the surface of the above-mentioned transparent substrate 1, by means of a spin coat method or the like, and is hardened so as to form the pigment recording layer 2 as shown in FIGS. 2 and 3. For example, 0.65 g of 1,1 dibutyl 3,3'3' tetramethyl 4,5,4'5' dibenzoid-dicarbocyanine-parchlorate (Nippon-Kannkousikiso Co., Ltd., Product No. NK3219) is dissolved into 10 ml of diacetone alcohol solvent. This is coated onto the surface of the above transparent substrate 1 also with the spin coat method, thereby forming a pigment recording layer 2 of a thickness of 130 nm.

Next, upon a whole surface of the area from 45 mm φ up to 118 mm φ in the diameter of the disc is formed a film layer such as an Au film layer of a thickness of 70 nm with a vacuum evaporation method, thereby forming a reflection layer 3 as shown in FIGS. 2 and 3. On the reflection layer 3, an ultraviolet curing resin is coated by the spin coat method, and then it is cured by irradiation of the ultraviolet ray on it, thereby forming a protection layer 4 of a thickness of 10 μm.

Further, a thin cover sheet 6 of polyprene is prepared by coating with an adhesive on one side surface thereof, and it is attached onto the surface of the above transparent substrate 1 at the adhesive surface on which the adhesive is coated. As the material of the cover sheet 6 is listed acrylic polymers, which can be obtained by using at least one or more kinds of monomers selected from, such as, ionomer resin, ethylene-vinyl chloride copolymer resin, ethylene vinyl acetate copolymer, ethylene vinyl acetate-vinyl chloride copolymer graft copolymer resin, vinylidene chloride resin, vinyl chloride resin, vinyl acetate resin, phenoxy resin, butadiene resin, polyacetal, polyamide (nylon), polyamidoimide, polyarylate, thermoplastic polyimide, polyetherimide, polyethylene, polyethylene terephthalate (PET), polycarbonate, polystyrene, polyvinyl alcohol (PVA), polyphenylene ether, polybutylene terephthalate, polymethylpentene, ethylenevinyl alcohol, etc., or further using other appropriate polymers. The polymer can be formed in a film, or also can be coated on the transparent substrate 1 after forming an acrylic adhesive layer thereon, so as to form the cover sheet 6 by drying it.

As an adhesive for attaching the cover sheet 6 on the surface of the transparent substrate 1, an acrylic adhesive is used, which is considerably weaker in bonding force comparing to general adhesives. From a view point that the cover sheet 6 can be exfoliated or removed from the surface of the transparent substrate 1 without causing a phenomenon of the adhesive remaining on it, as well as for preventing the floating thereof, the bonding force should be from 1 g/25 mm to 100 g/25 mm, and more preferably be from 1 g/25 mm to 30 g/25 mm. The thickness of the adhesive layer should be from 1 μm to 50 μm, and more preferably be from 5 μm to 20 μm.

As the acrylic adhesives can be listed one, which is made of a composition mainly containing a main monomer as a component for softening by decreasing the glass transition point (Tg is preferable to be equal or less than 100° C.), a small amount of a comonomer as a component to improve adhesiveness and cohesive force by increasing the glass transition point (Tg is preferable to be within a range from 150° C. to 250° C.), and a further acrylic copolymer having a monomer containing a functional group in a copolymerization component for improving bridging and adhesiveness, and it can be made of a synthetic material such as an acrylic acid ester. As the above-mentioned main monomer can be ethylacrylate (Tg: −22° C.), butylacrylate (Tg: −55° C.), 2-ethylhexylacrylate (Tg: −70° C.), etc. As the above-mentioned comonomer, there can be listed vinyl acetate, acrylonitrile (Tg: 97° C.), acrylamide (Tg: 165° C.), styrene (Tg: 80° C.), methylmethacrylate (Tg: 105° C.), methylacrylate (Tg: 8° C.), etc. As the above-mentioned functional monomer can be listed unsaturated monobasic acids, such as methacrylic acid (Tg: 228° C.), acrylic acid (Tg: 106° C.), etc., unsaturated dibasic acids such as itaconic acid (bridging base point), hydroxyethyl methacrylate (Tg: 55° C., 86° C.), hydroxypropyl methacrylate (Tg: 76° C.), dimethylaminoethyl methacrylate (Tg: 13° C.), acrylamide (Tg: 165° C.), meteororacrylamide (self-bridging), glycidyl methacrylate (bridging base point), maleic anhydride (adhesiveness, bridging base point), etc. The TG indicates the glass transition point of these polymers.

With the acrylic copolymer obtained from those monomers, it is preferable that the main monomer is contained in an amount equal to or less than 35 wt.% and that the monomer containing the functional group therein be present in an amount from 15 wt.% up to 3 wt.%, and for polymerization, a radical polymerization starter is added to those, such as benzoyl peroxide, azobisisobutyroonitrile, etc. More preferably, to those is further added polyamine, polyisocyanate, polyol, etc., for bridging. For the acrylic copolymer, it is preferable to be from 600,000 to 900,000 in average molecular weight before the bridging thereof, and is also preferable that the polymerization component with the main monomer occupies at least 50% therein. The average molecular weight range and the composition mentioned above are preferable to obtain a desired property with the adhesive.

The polymerization ratio of the main monomer can be calculated from the composition rate and polymerization ratio of the monomer. In more detail, a composition of a copolymer obtained by mixing 50 to 30 weight portions of an alkyl acrylate ester or alkyl methacrylate ester (carbon number 4 to 12), 50 to 20 weight portions of vinyl acetate or short-chained alkyl acrylate ester or alkyl methacrylate ester (carbon number 1 to 4), and 1 to 6 weight portions of maleic acid, is polymerized under a nitrogen atmosphere in a single solvent of toluene, benzene, or ethyl acetate, or in a mixture thereof (from 80 to 60 portions to the total copolymer from 20 to 40 portions), containing therein the radical starter, such as benzoyl peroxide, azobisisobutyroonitrile, under a temperature from 60° C. to 70° C. After polymerization, an equivalent from 0.01 to 3.0 of polyol, polyamine or polyisocyanate with respect to the maleic anhydride contained in the copolymer is added into the adhesive solvent, for the bridging. Thereby is obtained an adhesive which is superior in heat resistance.

The cover sheet 6 is adhered with the bonding force of the adhesive surface onto the surface of the transparent substrate, i.e., onto a light incident surface, thereby covering the surface. However, as shown in FIG. 1, by drawing up the cover sheet 6 at the edges thereof from the light incident surface 5 of the transparent substrate 1, it is easily possible to remove or detach it. The cover sheet 6 shown in the figure has a rip-like tub 7 which is formed extending outside the transparent substrate 1, therefore it can be easily removed or detached from the surface of the transparent substrate 1 by picking up the tub 7. The cover sheet 6 removed or detached from the surface of the transparent substrate 1 can be disposed, so as to be renewed or re-covered with another new cover sheet 6 to be attached thereto.

However, in FIG. 3, reference numeral 9 indicates the adhesive layer of the cover sheet 6.

Here, a stretch or tensile elongation rate of the cover sheet 6 which is attached on the surface of the transparent substrate 1 is selected to be equal or less than 200%. More preferably, the stretch rate of the cover sheet 6 should be kept to be equal or less than 120%. The stretch rate of the cover sheet 6, of course depends upon the material which forms the cover sheet, however, it is not determined evenly nor uniformly depending only on the material thereof. Since the stretch rate of the cover sheet 6 also depends on the degree of polymerization and the density of the synthetic resin forming the cover sheet 6, it differs for each of the cover sheets 6 even when they are formed from the same material. Accordingly, the stretch rate of the cover sheet 6 must be confirmed or checked by measuring it on test pieces which are produced under the same condition as the actual cover sheet 6.

The stretch rate of the cover sheet 6 is measured in accordance with JIS K 7127 (tensile test). Using a test piece of the length 150 mm and the width 15 mm, the test piece is stretched or pulled at the both ends thereof at a velocity of 200 mm/min. to be broken, under the conditions or a temperature of 23±2° C. and humidity of 50 ±5% RH. In this instance, comparing the distances between standard lines which are previously marked on the test piece, before and after the stretch or tensile test, and the difference between them is the stretch rate. Namely, assuming that the distance between the standard lines at the maximum load is L and the distance between the standard lines before the stretching is L0, the stretch rate is equal to $(L-L_0)/L_0$ (%) $(=(L-L_0)/L_0 (\%))$.

Further, a heat or thermal contraction or shrinkage rate of the cover sheet 6 which is attached onto the surface of the transparent substrate 1 is selected to be equal or less than 1.5%. The thermal contraction rate of the cover sheet 6 also depends on the material forming it, but it is not determined evenly nor uniformly only depending thereon. Since the thermal contraction rate of the cover sheet 6 also depends on the degree of polymerization and the density of the synthetic resin forming the cover sheet 6, it differs for each of the cover sheets 6 even when they are formed from the same material. Accordingly, the thermal contraction ratio of the cover sheet 6 also must be confirmed or checked by measuring it on test pieces which are produced under the same condition as the actual cover sheet 6.

The thermal contraction ratio of the cover sheet 6 is measured in accordance with JIS K 6734. Using a test piece of sizes 120 mm×120 mm, standard points are set or marked at a distance 100 mm vertically and horizontally in the central portion thereof. The test piece is positioned horizontally, it is heated at the temperature 80±2° C. for ten (10) minutes, and thereafter it is returned to a normal temperature (i.e., a room temperature). Comparing the distances between standard points on the test piece, before and after the heating, the difference between them is the thermal contraction rate. Namely, assuming that the distance between the standard points after the heating is 1 and that the distance between the standard points before the heating is $1_0=100$ mm, the thermal contraction rate is equal to $(1-1_0)/1_0(\%)$ $(=(1-1_0)/1_0(\%))$.

Further, the bonding force of the above cover sheet 6 onto the transparent substrate 1 per width of 25 mm is selected to be from 10 g/25 mm width up to 300 g/25 mm width. The reason of suppressing the bonding force of the cover sheet 6 be equal to or less than 300 g/25 mm width is for the purpose of buffering the stress transmission onto the transparent substrate 1 due to the contraction or shrinkage of the cover sheet following a change with the passage of time. However, if the bonding force of the cover sheet 6 is too small, it is easily exfoliated or detached, then it looses the function as the cover sheet 6. Therefore, the bonding force of the cover sheet 6 onto the transparent substrate 1 per the width of 25 mm must be equal or greater than 10 g/25 mm width.

Figure 4:
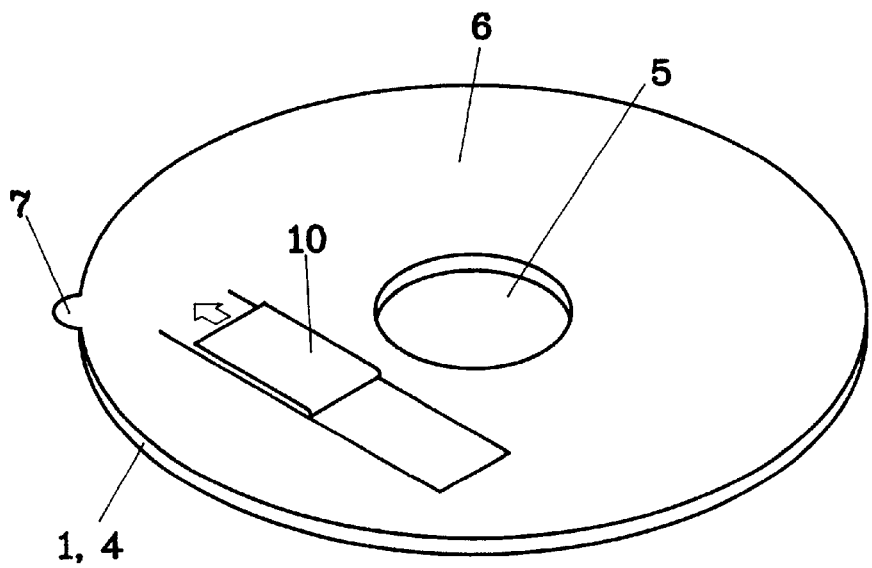
FIG. 4 shows a perspective view from the transparent substrate side of the optical disc according to the present invention, for showing a method of measuring bonding force of the cover sheet per a width of 25 mm thereof.

The bonding force of the cover sheet 6 onto the transparent substrate 1 per width of 25 mm is measured as shown in FIG. 4. The cover sheet 6 is cut with the width of 25 mm, and the cut portion of the width 25 mm is pulled up and turned at an angle of 180° (with respect to the surface of the transparent substrate 1), and it is exfoliated at the angle of 180° (with respect to the surface of the transparent substrate 1 as shown by an arrow). The bonding force per the width of 25 mm is measured by the exfoliating load applied thereto in that instance.

The bonding force, since it depends not only on the characteristics of the adhesive of the cover sheet 6 but also on surface condition of the transparent substrate 1, must be confirmed or checked by a result of measuring actual samples thereof.

Further, the cover sheet 6 is selected to be from 10 $\mu$m up to 1,000 $\mu$m in the thickness thereof. More preferably, it should be around from 50 $\mu$m up to 200 $\mu$m in the thickness thereof. If the cover sheet 6 is too thin, the change with the passage of time come to be large, while if it is too thick, it comes to be a cause of generating a large stress in the transparent substrate following the thermal contraction of the cover sheet 6.

In the manufacturing process of the CD-R, normally, such the cover sheet 6 is attached on the surface of the transparent substrate 1 in the following manner. First, the optical disc as mentioned in the above is positioned on a stage turning the side surface of the transparent substrate 1 upside, and the sheet cover 6 is also positioned on a separate stage. On each of the stages, there are provided a plurality of suction holes, therefore by making the suction holes at a negative pressure (vacuum), the optical disc and the cover sheet 6 are held on the stages, respectively. The stage holding the cover sheet 6 is turned over and is faced with the transparent substrate 1 of the above optical disc which is held on the separate stage. Thereafter, the stage holding the cover sheet 6 descends down so as to position the cover sheet 6 onto the transparent substrate 1 of the optical disc, and then the suction by means of the suction holes is stopped. Further, the cover sheet 6 is released from the stage while flattening it by means of a roller, and thereafter it is pressed as a whole. With this, the air lying between the cover sheet 6 and the surface of the transparent substrate 1 is removed, and at the same time the cover sheet 6 is attached onto the surface of the transparent substrate 1. Thereby, the optical disc as shown in FIG. 1 is completed.

Figure 5:
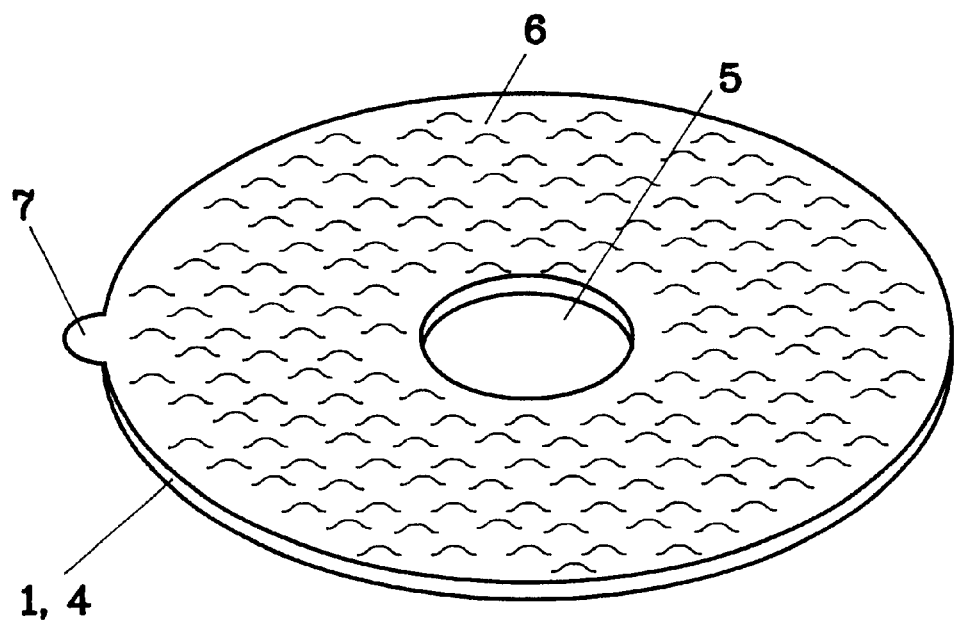
FIG. 5 shows a perspective view of another embodiment of the optical disc according to the present invention, seeing from the transparent substrate side thereof.

Next, explaining the example shown in FIG. 5, the cover sheet 6 is treated with a crimping process so as to form fine wrinkles or lines in convex and/or concave shapes on it, in this example. With this, the cover sheet 6 can be prohibited from being totally adhered onto the surface of the transparent substrate 1 of the optical disc as a whole. By doing so, in particular with the wrinkles, they reduce the bonding force of the cover sheet 6 onto the surface of the transparent substrate 1, and they also absorb the contraction or expansion of the cover sheet 6 due to the change with the passage of time not to reach the transparent substrate 1. Accordingly, stresses hardly occur in the transparent substrate 1, following the change with the passage of time on the cover sheet 6, thereby it is possible to protect the transparent substrate 1 from being curved by the bending thereof.

Next, the more detailed embodiments of the present invention will be explained by referring to specific examples thereof.

Embodiment 1

As the transparent substrate 1 is prepared a polycarbonate disc in the shape of donuts, having the thickness 1.2 mm, the outer diameter 120 mm φ, the inner diameter 15 mm φ, and it includes the spiral pre-groove of the width 0.8 μm, the depth 0.08 μm and the pitch 1.6 μm, which is formed on the one surface thereof in the area from 46 mm up to 117 mm in the diameter.

Dissolving 0.65 g of the 1,1 dibutyl 3,3'3' tetramethyl 4,5,4'5' dibenzoid-dicarbocyanine-parchlorate (Nippon-Kannkousikiso Co., Ltd., Product No. NK3219) into 10 ml of the diacetone alcohol solvent, and coating it onto the surface of the above transparent substrate 1, in the area where the above pre-groove is formed, with the spin coat method, thereby forming the pigment recording layer 2 of the thickness 130 nm as shown in FIGS. 2 and 3.

Next, upon the whole surface of the area from 45 mm φ up to 118 mm φ in the diameter of the disc is formed the Au film layer of thickness of 70 nm by the vacuum evaporation method, thereby forming the reflection layer 3 as shown in FIGS. 2 and 3. On the reflection layer 3, the ultraviolet curing resin is also coated by the spin coat method, and then it is cured by irradiation of the ultraviolet ray on it, thereby forming the protection layer 4 of the thickness of 10 μm.

Preparing a polypropylene film having a gas permeability and a thickness of 100 μm, the acrylic adhesive of bridged acrylic acid copolymer is coated onto one side of the polypropylene film to be dried, thereby forming the adhesive layer of thickness of 13 μm thereon. This obtained polypropylene film is punched into a shape of a ring of an inner diameter of 40 mm φ and an outer diameter of 119 mm φ, and it is attached upon the surface of the above polycarbonate substrate 1 at the above adhesive layer with a method of pressing and moving a roller.

In this instance, three kinds of the cover sheets 6 of 100%, 200% and 300% in the stretch rate are prepared to be attached onto the surface of the transparent substrate 1, and those cover sheets 6 are attached onto them so as to prepare a hundred (100) pieces of each for the optical discs. The stretch rate is adjusted by the degree of polymerization of the resin from which the cover sheet 6 is formed. However, the thermal contraction rate is 1.0% and the bonding force onto the surface of the transparent substrate 1 per 25 mm width is 200 g/25 mm width, for every one of those cover sheets 6.

The three (3) kinds of optical discs are introduced into an environment of a temperature of 70° C. and humidity of 85% RH by attaching the cover sheet thereon, and are disposed for 100 hours therein. Thereafter, the optical discs are taken out therefrom, the angle of curve is measured for each of them, in accordance with the standard for CD-R, i.e., the Orange Book. As the result of this, the angle of curve for the optical disc on which is attached the cover sheet 6 of the stretching rate of 100% is 0.3 deg., for the optical disc on which is attached the cover sheet 6 of the stretching rate of 200% is 0.6 deg., and for the optical disc on which is attached the cover sheet 6 of the stretching rate of 280% is 0.8 deg. According to the standard for CD-R, i.e., the Orange Book, the angle of curve for the CD-R is determined to be equal or less than 0.6 deg.

Embodiment 2

With the optical discs produced in the same manner as in the embodiment 1 mentioned above, also three (3) kinds of the cover sheets 6, of 1.0%, 1.5% and 1.9% in the thermal contraction rate are prepared. The thermal contraction rate is adjusted with the degree of polymerization of the resin, from which the cover sheet 6 is formed. Those cover sheets 6 are attached onto the optical discs, thereby producing a hundred (100) pieces of the optical discs for each. However, the stretch rate for any one of the cover sheets 6 is 100%, and the bonding force for each is 200 g/25 mm onto the surface of the transparent substrate 1 width per the 25 mm width thereof.

Those three (3) kinds of the optical discs are introduced into the environment of the temperature of 70° C. and the humidity of 85% RH after attaching the cover sheet thereon, and are disposed for 100 hours therein. Thereafter, the optical discs are taken out therefrom, the angle of curve is measured for each of them, in accordance with the standard for CD-R, i.e., the Orange Book. As the result of this, the angle of curve for the optical disc on which is attached the cover sheet 6 of the thermal contraction rate of 1.0% is 0.4 deg., for the optical disc on which is attached the cover sheet 6 of the thermal contraction rate of 1.5% is 0.6 deg., and for the optical disc on which is attached the cover sheet 6 of the thermal contraction of 1.9% is 0.9 deg.

Embodiment 3

With the optical discs produced in the same manner as in the embodiment 1 mentioned above, by attaching the cover sheets 6 onto the surfaces of the transparent substrates thereof with the bonding forces 400 g/25 mm width, 200 g/25 mm width and 100 g/25 mm width, respectively, three (3) kinds of the optical discs are prepared, with a hundred (100) pieces for each. However, for any one of the cover sheets 6, the stretch rate is 100%, and the thermal contraction rate is 1.0%.

Those three (3) kinds of the optical discs are also introduced into the environment of the temperature of 70° C. and the humidity of 85% RH after attaching the cover sheets thereon, and are disposed for 100 hours therein. Thereafter, the optical discs are taken out therefrom, the angle of curve is measured for each of them, in accordance with the standard for CD-R, i.e, the Orange Book. As the result of this, the angle of curve for the optical disc on which is attached the cover sheet 6 with the bonding force of 400 g/25 mm width is 0.7 deg., for the optical disc on which is attached the cover sheet 6 with the bonding force of 200 g/25 mm width is 0.5 deg., and for the optical disc on which is attached the cover sheet 6 with the bonding force of 100 g/25 mm width is 0.4 deg.

By forming the cover sheet 6 upon the base film having the fine concave and convex portions thereon in the same manner as in the embodiment 1 mentioned above, wrinkles of concave and convex shape as shown in FIG. 5 are formed on the cover sheet 5, thereby it is also possible to control the bonding force of the sheet cover 5 onto the surface of the transparent substrate 1 with the degree of the concavity and convexity of those wrinkles.

What is claimed is:

1. An optical disc having a transparent substrate, and being recordable with a signal by irradiating recording light at the transparent substrate side thereof, comprises a detachable polymeric cover sheet bonded by an adhesive to the transparent substrate at a surface side thereof for incidence of recording light and reproducing light, and wherein a stretch rate of the polymeric cover sheet is equal to or less than 200%, as measured in accordance with JIS K 7127.

2. An optical disc as defined in claim 1, wherein a thermal contraction rate of said cover sheet is equal or less than 1.5%, as measured in accordance with JIS K 6734.

3. An optical disc as defined in the claim 2, wherein a bonding force of said cover sheet onto a surface of said transparent substrate per 25 mm width is from 10 g/25 mm width to 300 g/25 mm width.

4. An optical disc as defined in the claim 1, wherein the thickness of said cover sheet is from 10 $\mu$m to 1,000 $\mu$m.

5. An optical disc which is recordable by irradiated recording light at a transparent substrate side thereof, said optical disc comprising a transparent substrate, a detachable polymeric cover sheet bonded to a surface of the transparent substrate on which recording and reproducing light is incident and an adhesive bonding the detachable polymeric cover sheet to the transparent substrate, said polymeric cover sheet having a stretch rate of no more than 200% as measured in accordance with JIS K 7127, a thermal contraction rate no greater than 1.5% as measured in accordance with JIS K 6734, a thickness of from 10–1000 $\mu$m and is bonded to said transparent substrate at a bonding force of from 10 g/25 mm width to 300 g/25 mm width.

6. An optical disc as defined in claim 5, wherein said cover sheet is formed with fine wrinkles of convex and/or concave shape thereon.

7. An optical disc as defined in claim 5, wherein the polymeric cover sheet is formed of an acrylic polymer.

8. An optical disc as defined in claim 5, wherein the adhesive is an acrylic adhesive.

* * * * *